United States Patent
Fukuroda et al.

(10) Patent No.: US 10,494,516 B2
(45) Date of Patent: Dec. 3, 2019

(54) PROPYLENE RESIN COMPOSITION AND INJECTION MOLDED ARTICLE

(71) Applicant: Sumitomo Chemical Company, Limited, Tokyo (JP)

(72) Inventors: Hiroshi Fukuroda, Ichihara (JP); Toshiharu Sanada, Ichihara (JP); Toshiya Maruyama, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 98 days.

(21) Appl. No.: 15/949,140

(22) Filed: Apr. 10, 2018

(65) Prior Publication Data

US 2018/0298175 A1  Oct. 18, 2018

(30) Foreign Application Priority Data

Apr. 14, 2017 (JP) .................................. 2017-080584

(51) Int. Cl.
*C08L 23/12* (2006.01)
*C08K 3/34* (2006.01)

(52) U.S. Cl.
CPC ......... *C08L 23/12* (2013.01); *C08L 2205/025* (2013.01); *C08L 2205/035* (2013.01)

(58) Field of Classification Search
USPC ....................................................... 525/240
See application file for complete search history.

(56) References Cited

U.S. PATENT DOCUMENTS

| | | | |
|---|---|---|---|
| 9,260,597 B2 * | 2/2016 | Goberti | C08L 23/10 |
| 9,580,586 B2 * | 2/2017 | Shipley | C08L 23/16 |
| 2004/0014871 A1 | 1/2004 | Zanka et al. | |

FOREIGN PATENT DOCUMENTS

| | | |
|---|---|---|
| EP | 0739944 A1 | 10/1996 |
| EP | 2330139 A1 | 6/2011 |
| JP | 2002145941 A | 5/2002 |
| JP | 2011132294 A | 7/2011 |
| JP | 2011190407 A | 9/2011 |
| WO | 1999015586 A1 | 4/1999 |

* cited by examiner

*Primary Examiner* — Fred M Teskin
(74) *Attorney, Agent, or Firm* — Panitch Schwarze Belisario & Nadel LLP

(57) ABSTRACT

The present invention relates to a propylene resin composition including: a propylene homopolymer (A); a heterophasic propylene polymer material (B) consisting of a propylene-based polymer (I) containing 80% by mass or more of a monomer unit derived from propylene, and a propylene copolymer (II) containing 40% by mass or more and 80% by mass or less of a monomer unit derived from ethylene and the like, and containing a monomer unit derived from propylene; and an ethylene-α-olefin copolymer (C), wherein a molecular weight distribution of a crystalline polypropylene component is 6.0 or more, and contents of the component (A), the component (B) and the component (C) are 10 to 55 parts by mass, 10 to 55 parts by mass, and 10 to 40 parts by mass, respectively, with respect to 100 parts by mass in total of the component (A), the component (B) and the component (C).

4 Claims, No Drawings

PROPYLENE RESIN COMPOSITION AND INJECTION MOLDED ARTICLE

TECHNICAL FIELD

The present invention relates to a propylene resin composition and an injection molded article.

BACKGROUND

Molded articles formed from a propylene resin composition are used for automotive materials, household electrical appliances and the like. As for the above described molded article, in Patent Document 1, for instance, a molded article formed from a propylene-based resin composition is described that contains a propylene-based block copolymer and an elastomer, which consists of a portion soluble (Dsol) in room temperature n-decane of which the ethylene content is 25 to 45 mol % and a portion insoluble (Dinsol) in room temperature n-decane.

CITATION LIST

Patent Literature

[Patent Literature 1] Japanese Unexamined Patent Publication No. 2011-132294

SUMMARY

In recent years, high dimensional stability is required of molded articles which are used for automotive materials, household electrical appliances and the like.

Then, an object of the present invention is to provide a propylene resin composition from which a molded article excellent in dimensional stability can be produced. Another object of the present invention is to provide an injection molded article excellent in the dimensional stability.

The present invention relates to a propylene resin composition including: a propylene homopolymer (A); a heterophasic propylene polymer material (B) consisting of a propylene-based polymer (I) containing 80% by mass or more of a monomer unit derived from propylene, and a propylene copolymer (II) containing 40% by mass or more and 80% by mass or less of a monomer unit derived from at least one α-olefin selected from the group consisting of ethylene and α-olefins having 4 or more and 12 or less carbon atoms, and containing a monomer unit derived from propylene; and an ethylene-α-olefin copolymer (C), the ethylene-α-olefin copolymer (C) not containing a monomer unit derived from propylene, wherein a molecular weight distribution (Mw/Mn of part P) of a crystalline polypropylene component calculated from the following expressions (1), (2), (3), (4) and (5) is 6.0 or more; and contents of the propylene homopolymer (A), the heterophasic propylene polymer material (B) and the ethylene-α-olefin copolymer (C) are 10 to 55 parts by mass, 10 to 55 parts by mass, and 10 to 40 parts by mass, respectively, with respect to 100 parts by mass in total of the propylene homopolymer (A), the heterophasic propylene polymer material (B) and the ethylene-α-olefin copolymer (C), $$Mw/Mn \text{ of part } P = Mw(A,CXIS(B))/Mn(A,CXIS(B)) \quad (1),$$

$$Mw(A,CXIS(B)) = Mw(A) \times \phi(A) + Mw(CXIS(B)) \times \phi(CXIS(B)) \quad (2),$$

$$Mn(A,CXIS(B)) = 1/(\phi(A)/Mn(A) + \phi(CXIS(B))/Mn(CXIS(B))) \quad (3),$$

$$\phi(A) = X/(X+Y) \quad (4), \text{ and}$$

$$\phi(CXIS(B)) = Y/(X+Y) \quad (5)$$

wherein Mw(A) and Mn(A) represent a weight average molecular weight and a number average molecular weight of the propylene homopolymer (A), respectively, and Mw(CXIS(B)) and Mn(CXIS(B)) represent a weight average molecular weight and a number average molecular weight of the xylene-insoluble component in the heterophasic propylene polymer material (B), respectively; and X represents a content (% by mass) of the propylene homopolymer (A) with respect to a total mass of the propylene resin composition, and Y represents a content (% by mass) of the xylene-insoluble component in the heterophasic propylene polymer material (B) with respect to the total mass of the propylene resin composition.

The propylene resin composition of the present invention may be an aspect of further containing a filler (D), wherein a content of the filler (D) is 1 to 65 parts by mass, with respect to 100 parts by mass in total of the propylene homopolymer (A), the heterophasic propylene polymer material (B) and the ethylene-α-olefin copolymer (C).

The present invention also relates to an injection molded article formed of the above propylene resin composition.

According to the present invention, the propylene resin composition can be provided from which a molded article excellent in the dimensional stability can be produced. According to the present invention, the injection molded article can be provided that is excellent in dimensional stability.

DETAILED DESCRIPTION

Definition

In the present specification, the term "α-olefin" means an unsaturated aliphatic hydrocarbon having a carbon-carbon unsaturated double bond at the α-position.

In the present specification, the term "heterophasic propylene polymer material" means a mixture having a structure in which a propylene copolymer containing a monomer unit derived from at least one α-olefin selected from the group consisting of ethylene and α-olefins having 4 or more and 12 or less carbon atoms and a monomer unit derived from propylene disperse in a matrix of a propylene-based polymer containing 80% by mass or more of a monomer unit derived from propylene (provided that total mass of propylene-based polymer is 100% by mass).

In the present specification, the term "ethylene-α-olefin copolymer" means a copolymer that contains a monomer unit derived from ethylene and a monomer unit derived from an α-olefin having 4 or more carbon atoms, and does not contain a monomer unit derived from propylene.

In the present specification, the term "xylene-insoluble component (also referred to as "component CXIS")" means a solid body that is a component insoluble in p-xylene that is contained in the heterophasic propylene polymer material and is obtained by the following method.

The solid body precipitates in a cooled solution obtained by cooling the solution to 20° C., which has been obtained by dissolving about 2 g of the heterophasic propylene polymer material in boiling p-xylene for 2 hours.

In the present specification, the term "crystalline polypropylene component" means the xylene-insoluble component in a propylene homopolymer and the heterophasic propylene polymer material.

In the present specification, the term "propylene resin composition" means a composition containing the heterophasic propylene polymer material.

Hereafter, some embodiments of the present invention will be described in detail. However, the present invention is not limited to the following embodiments. In the present specification, the description of "lower limit to upper limit" which represents a numerical range represents "the lower limit or more and the upper limit or less", and the description of the "upper limit to the lower limit" represents "the upper limit or less and the lower limit or more". In other words, these descriptions represent numerical ranges containing the upper limit and the lower limit.

[Propylene Resin Composition]

The propylene resin composition according to the present embodiment (hereinafter also referred to simply as a resin composition) includes: a propylene homopolymer (A); a heterophasic propylene polymer material (B) consisting of a propylene-based polymer (I) containing 80% by mass or more of a monomer unit derived from propylene, and a propylene copolymer (II) containing 40% by mass or more and 80% by mass or less of a monomer unit derived from at least one α-olefin selected from the group consisting of ethylene and α-olefins having 4 or more and 12 or less carbon atoms, and containing a monomer unit derived from propylene; and an ethylene-α-olefin copolymer (C), wherein a molecular weight distribution (Mw/Mn of part P) of a crystalline polypropylene component calculated from the following expressions (1), (2), (3), (4) and (5) is 6.0 or more; and contents of the propylene homopolymer (A), the heterophasic propylene polymer material (B) and the ethylene-α-olefin copolymer (C) are 10 to 55 parts by mass, 10 to 55 parts by mass, and 10 to 40 parts by mass, respectively, with respect to 100 parts by mass in total of the propylene homopolymer (A), the heterophasic propylene polymer material (B) and the ethylene-α-olefin copolymer (C).

$$\text{Mw/Mn of part } P = \text{Mw}(A, CXIS(B))/\text{Mn}(A, CXIS(B)) \quad (1),$$

$$\text{Mw}(A, CXIS(B)) = \text{Mw}(A) \times \phi(A) + \text{Mw}(CXIS(B)) \times \phi(CXIS(B)) \quad (2),$$

$$\text{Mn}(A, CXIS(B)) = 1/(\phi(A)/\text{Mn}(A) + \phi(CXIS(B))/\text{Mn}(CXIS(B))) \quad (3),$$

$$\phi(A) = X/(X+Y) \quad (4), \text{ and}$$

$$\phi(CXIS(B)) = Y/(X+Y) \quad (5).$$

Here, Mw(A) and Mn(A) represent a weight average molecular weight and a number average molecular weight of the propylene homopolymer (A), respectively, and Mw(CXIS(B)) and Mn(CXIS(B)) represent a weight average molecular weight and a number average molecular weight of the xylene-insoluble component in the heterophasic propylene polymer material (B), respectively.

X represents a content (% by mass) of the propylene homopolymer (A) with respect to a total mass of the propylene resin composition, and Y represents a content (% by mass) of the xylene-insoluble component in the heterophasic propylene polymer material (B) with respect to the total mass of the propylene resin composition.

The molecular weight distribution (Mw/Mn of part P) of the crystalline polypropylene component may be, for instance, 7.0 or more, or may be 7.5 or more, from the viewpoint of further improving the dimensional stability at the time when the propylene resin composition has been formed into a molded article. The molecular weight distribution of the crystalline polypropylene component may be, for instance, 30.0 or less, or may be 25.0 or less. From these viewpoints, it is preferable for the molecular weight distribution of the crystalline polypropylene component to be 7.0 to 30.0, and is more preferable to be 7.5 to 25.0.

The molecular weight distribution (Mw/Mn of part P) of the crystalline polypropylene component can be controlled within the above described range, by adjusting the molecular weight distribution of the propylene homopolymer (A), the molecular weight distribution of the xylene-insoluble component in the heterophasic propylene polymer material (B), the content of the propylene homopolymer (A) in the propylene resin composition, the content of the heterophasic propylene polymer material (B) therein, and the content of the xylene-insoluble component in the heterophasic propylene polymer material (B).

Here, in the present specification, the weight average molecular weight (Mw) and number average molecular weight (Mn) of each component are measured under the following conditions by using a gel permeation chromatograph (GPC) method.

Apparatus: HLC-8121 GPC/HT made by Tosoh Corporation

Separation column: 3 columns of GMHHR-H(S)HT made by Tosoh Corporation

Measurement temperature: 140° C.

Carrier: Orthodichlorobenzene

Flow rate: 1.0 mL/min

Sample concentration: about 1 mg/mL

Amount of injected sample: 400 µL

Detector: differential refractometry

Calibration curve preparation method: standard polystyrene was used.

The molecular weight distribution (Mw/Mn) represented by a ratio of the weight average molecular weight (Mw) with respect to the number average molecular weight (Mn) is calculated with the use of the weight average molecular weight (Mw) and number average molecular weight (Mn) obtained by the above measurement.

The xylene-insoluble component is a component insoluble in xylene. In the present specification, a xylene-soluble component (hereinafter referred to also as "component CXS") refers to a component which elutes in xylene after heating in boiling xylene for 2 hours and then cooling to 20° C.

Hereinafter, each component represented by the above described "propylene homopolymer (A)" or the like is referred to simply as "component A" or the like.

Each component will be described below.

[Propylene Homopolymer (A)]

The component A is a polymer obtained by polymerizing propylene alone. The propylene resin composition of the present embodiment may contain only one component A, or may contain two or more components A.

It is preferable for the molecular weight distribution (Mw(A)/Mn(A)) of the component A to be 3.0 or more, and is more preferable to be 6.0 or more, from the viewpoint of the dimensional stability at the time when the propylene resin composition has been formed into a molded article. The molecular weight distribution of the component A may be, for instance, 30.0 or less, or may be 25.0 or less. The molecular weight distribution of the component A is preferably 3.0 to 30.0, and more preferably 6.0 to 25.0.

It is preferable for the isotactic pentad fraction (also referred to as "mmmm" fraction) of the component A is to be 0.950 or more and is more preferable to be 0.970 or more, from the viewpoint of rigidity and dimensional stability of the molded article formed from the resin composition. The isotactic pentad fraction of the component A may be, for instance, 1.000 or less. A polymer having an isotactic pentad fraction close to 1 is considered to have high stereoregularity of the molecular structure and to be highly crystalline.

The isotactic pentad fraction means an isotactic fraction in a pentad unit. In other words, the isotactic pentad fraction indicates a content of a structure in which five monomer units that are derived from propylene are continuously meso-bonded in terms of pentad units. Incidentally, when the component of interest is a copolymer, the isotactic pentad fraction means a value that is measured for the chain of monomer units which are derived from propylene.

In the present specification, the isotactic pentad fraction refers to a value that is measured by the $^{13}$C-NMR spectrum. Specifically, a ratio of an area of an mmmm peak with respect to an area of the total absorption peak in a methyl carbon region which is obtained by the $^{13}$C-NMR spectrum is defined as the isotactic pentad fraction. Incidentally, a method for measuring the isotactic pentad fraction by the $^{13}$C-NMR spectrum is described, for instance, in Macromolecules, 6, 925 (1973) written by A. Zambelli and others. However, absorption peaks obtained by the $^{13}$C-spectrum are attributed to the description of Macromolecules, 8, 687 (1975).

It is preferable for a melt flow rate of the component A at a temperature of 230° C. and at a load of 2.16 kgf to be 5 g/10 min or more, is more preferable to be 30 g/10 min to 300 g/10 min, is further preferable to be 80 g/10 min to 300 g/10 min, and is particularly preferable to be more than 100 g/10 min and 300 g/10 min or less, from the viewpoint of moldability of the resin composition.

In the present specification, the melt flow rate refers to a value measured in accordance with JIS K 7210. In addition, the melt flow rate may be hereinafter referred to as MFR.

An intrinsic-viscosity number ([η]) of the component A may be, for instance, 0.10 to 2.00 dL/g, may be 0.50 to 1.50 dL/g, or may be 0.70 to 1.40 dL/g.

In the present specification, the intrinsic-viscosity number (unit: dL/g) is a value which is measured at a temperature of 135° C. by using tetralin as a solvent, by the following method.

Reduced viscosity is measured at three points of concentrations of 0.1 g/dL, 0.2 g/dL, and 0.5 g/dL, by using an Ubbelohde viscometer. The intrinsic-viscosity number is determined by an extrapolation method of plotting the reduced viscosity against the concentration and extrapolating the concentration to zero. A method for calculating the intrinsic-viscosity number by the extrapolation method is described, for instance, in "Polymer Solutions, Polymer Experimentology 11" (published by Kyoritsu Shuppan Co., Ltd. 1982), page 491.

The component A can be produced, for instance, by a polymerization of propylene in the presence of a polymerization catalyst.

Examples of the polymerization catalyst include: a Ziegler type catalyst; a Ziegler-Natta type catalyst; a catalyst that consists of a chemical compound of a transition metal in Group 4 of the periodic table having a cyclopentadienyl ring, and of an alkylaluminoxane; a catalyst that consists of a chemical compound of a transition metal in Group 4 of the periodic table having a cyclopentadienyl ring, a chemical compound which reacts with the transition metal compound to form an ionic complex, and an organoaluminum compound; and a catalyst in which a catalytic component (a chemical compound of a transition metal in Group 4 of the periodic table having a cyclopentadienyl ring, chemical compound which forms an ionic complex, an organoaluminum compound and the like) is carried on an inorganic particle (silica, clay minerals or the like), and is denatured.

Such catalysts may be used as the above described polymerization catalysts as to be described in Japanese Unexamined Patent Publication No. S61-218606, Japanese Unexamined Patent Publication No. H5-194685, Japanese Unexamined Patent Publication No. H7-216017, Japanese Unexamined Patent Publication No. H9-316147, Japanese Unexamined Patent Publication No. H10-212319, and Japanese Unexamined Patent Publication No. 2004-182981.

A polymer obtained by prepolymerizing propylene in the presence of the above described polymerization catalyst can also be used as the polymerization catalyst.

Examples of the polymerization methods include bulk polymerization, solution polymerization, and gas phase polymerization. Here, the bulk polymerization refers to a method in which the polymerization is carried out by using a liquid olefin as a medium at a polymerization temperature, and the solution polymerization is a method in which the polymerization is carried out in an inert hydrocarbon solvent such as propane, butane, isobutane, pentane, hexane, heptane and octane. In addition, the gas phase polymerization refers to a method of using a gaseous monomer as a medium, and polymerizing the gaseous monomers in the medium.

Examples of the manner of polymerization include batch system, a continuous system and combinations thereof. The manner of polymerization may be a multistage system in which a plurality of polymerization reaction vessels are connected in series.

From the viewpoint of industrial and economic superiority, it is preferable that the component A is produced by a continuous type of gas phase polymerization method or a bulk-gas phase polymerization method in which a bulk polymerization method and a gas phase polymerization method are carried out continuously.

Various conditions (polymerization temperature, polymerization pressure, monomer concentration, amount of catalyst to be charged, polymerization time period and the like) in the polymerization step may be appropriately determined according to a molecular structure of an aimed component A.

It is acceptable to dry the component A at a temperature or lower at which the component A melts, as needed after the polymerization step, so as to remove a remaining solvent contained in the component A, oligomers of very low molecular weight, which are produced as by-products at the time of production, and the like. Examples of drying methods include the methods described in Japanese Unexamined Patent Publication No. S55-75410, Japanese Patent No. 2565753 and the like.

The content of the component A may be, for instance, 20 to 55 parts by mass, or may be 30 to 55 parts by mass, with respect to 100 parts by mass in total of the component A, the component B and the component C, from the viewpoint of dimensional stability of the molded article.

[Heterophasic Propylene Polymer Material (B)]

The component B consists of: a propylene-based polymer (I) containing 80% by mass or more of a monomer unit derived from propylene; and a propylene copolymer (II) containing 40% by mass or more and 80% by mass or less of a monomer unit derived from at least one α-olefin selected from the group consisting of ethylene and α-olefins having 4 or more and 12 or less carbon atoms, and containing a monomer unit derived from propylene. The propylene resin composition of the present embodiment may contain only one component B, or may contain two or more components.

It is considered that in the present embodiment, the xylene-insoluble (CXIS) component in the component B is mainly composed of the propylene-based polymer (I), and that the xylene-soluble (CXS) component in the component B is mainly composed of the propylene copolymer (II).

The component B can be produced, for instance, by a first polymerization step of forming a propylene-based polymer (I) and a second polymerization step of forming a propylene copolymer (II).

In the first polymerization step, a propylene-containing monomer is polymerized, for instance, in the presence of a polymerization catalyst to form a propylene-based polymer containing 80% by mass or more of a monomer unit derived from propylene. Exemplary polymerization catalysts are the same as described above.

In the second polymerization step, for instance, at least one α-olefin selected from the group consisting of ethylene and α-olefins having 4 or more and 12 or less carbon atoms and propylene are polymerized with each other in the presence of a propylene-based polymer which has been obtained in the first polymerization step. Thereby, a heterophasic propylene polymer material is formed which consists of the propylene-based polymer (I) and the propylene copolymer (II).

The propylene-based polymer (I) may be, for instance, a propylene homopolymer, and may contain a monomer unit derived from a monomer other than propylene. When the propylene-based polymer (I) contains the monomer unit derived from the monomer other than propylene, this content may be, for instance, 0.01% by mass or more and less than 20% by mass, based on the total mass of the propylene-based polymer (I).

Examples of monomers other than propylene include ethylene and α-olefins having 4 or more and 12 or less carbon atoms. Among the monomers, at least one monomer selected from the group consisting of ethylene and α-olefins having 4 to 10 carbon atoms is preferable, and at least one monomer selected from the group consisting of ethylene, 1-butene, 1-hexene and 1-octene is more preferable, and at least one monomer selected from the group consisting of ethylene and 1-butene is further preferable.

Examples of the propylene-based polymer containing a monomer unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer and a propylene-ethylene-1-octene copolymer.

It is preferable for the propylene-based polymer (I) to be a propylene homopolymer, a propylene-ethylene copolymer, a propylene-1-butene copolymer, a propylene-ethylene-1-butene copolymer, and is more preferable to be the propylene homopolymer, from the viewpoints of the rigidity and dimensional stability of the molded article.

It is preferable for the content of the propylene-based polymer (I) to be 50 to 99% by mass, and is more preferable to be 60 to 90% by mass, based on the total mass of the component B.

The propylene copolymer (II) contains 40% by mass or more and 80% by mass or less of a monomer unit derived from at least one α-olefin selected from the group consisting of ethylene and α-olefins having 4 or more and 12 or less carbon atoms, and contains a monomer unit derived from propylene.

In the propylene copolymer (II), a content of a monomer unit derived from at least one α-olefin selected from the group consisting of ethylene and α-olefins having 4 or more and 12 or less carbon atoms may be, for instance, 45% by mass or more, from the viewpoint of the coefficient of linear expansion of the molded article. In addition, this content may be, for instance, 70% by mass or less or 60% by mass or less, from the viewpoint of the compatibility between the propylene copolymer (II) and the component A and the viewpoint of an impact resistance of the molded article. It is preferable for the above described content to be 40 to 70% by mass, and is more preferable to be 45 to 60% by mass.

In the propylene copolymer (II), as for the at least one α-olefin selected from the group consisting of ethylene and α-olefins having 4 to 12 carbon atoms, at least one type selected from the group consisting of ethylene and α-olefins having 4 to 10 carbon atoms is preferable; at least one type selected from the group consisting of ethylene, 1-butene, 1-hexene, 1-octene and 1-decene is more preferable; and at least one type selected from the group consisting of ethylene and 1-butene is further preferable.

Examples of the propylene copolymer (II) include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer and a propylene-1-decene copolymer. Among the copolymers, it is preferable for the above described propylene copolymer to be a propylene-ethylene copolymer, a propylene-1-butene copolymer or a propylene-ethylene-1-butene copolymer, and is more preferable to be a propylene-ethylene copolymer.

It is preferable for the content of the propylene copolymer (II) to be 1 to 50% by mass, and is more preferable to be 10 to 40% by mass, based on the total mass of the component B.

It is preferable for the content of the component CXIS in the component B to be 50 to 99% by mass, and is more preferable to be 60 to 90% by mass, based on the total mass of the component B.

It is preferable for the content of the component CXS in the component B to be 1 to 50% by mass, and is more preferable to be 10 to 40% by mass, based on the total mass of the component B.

Examples of the component B include a (propylene)-(propylene-ethylene) polymer material, a (propylene)-(propylene-ethylene-1-butene) polymer material, a (propylene)-(propylene-ethylene-1-hexene) polymer material, a (propylene)-(propylene-ethylene-1-octene) polymer material, a (propylene)-(propylene-1-butene) polymer material, a (propylene)-(propylene-1-hexene) polymer material, a (propylene)-(propylene-1-octene) polymer material, a (propylene)-(propylene-1-decene) polymer material, a (propylene-ethylene)-(propylene-ethylene) polymer material, a (propylene-ethylene)-(propylene-ethylene-1-butene) polymer material, a (propylene-ethylene)-(propylene-ethylene-1-hexene) polymer material, a (propylene-ethylene)-(propylene-ethylene-1-octene) polymer material, a (propylene-ethylene)-(propylene-ethylene-1-decene) polymer material, a (propylene-ethylene)-(propylene-1-butene) polymer material, a (propylene-ethylene)-(propylene-1-hexene) polymer material, a (propylene-ethylene)-(propylene-1-octene) polymer material, a (propylene-ethylene)-(propylene-1-decene) polymer material, a (propylene-1-butene)-(propylene-ethylene) polymer material, a (propylene-1-butene)-(propylene-ethylene-1-butene) polymer material, a (propylene-1-butene)-(propylene-ethylene-1-hexene) polymer material, a (propylene-1-butene)-(propylene-ethylene-1-octene) polymer material, a (propylene-1-butene)-(propylene-ethylene- 1-decene) polymer material, a (propylene-1-butene)-(propylene-1l-butene) polymer material, a (propylene-1-butene)-(propylene-1-hexene) polymer material, a (propylene-1-butene)-(propylene-1-octene) polymer material, a (propylene-1-butene)-(propylene-1-decene) polymer material, a (propylene-1-hexene)-(propylene-1-hexene) polymer material, a (propylene-1-hexene)-(propylene-1-octene) polymer material, a (propylene-1-hexene)-(propylene-1-decene) polymer material, a (propylene-1-octene)-(propylene-1l-octene) polymer material, and a (propylene-1-octene)-(propylene-1-decene) polymer material.

Here, the description of "(propylene)-(propylene-ethylene) polymer material" means that "the propylene-based polymer (I) is a propylene homopolymer, and the propylene copolymer (II) is a heterophasic propylene polymer material which is a propylene-ethylene copolymer". The description is similar in other similar expressions.

It is preferable for the component B to be the (propylene)-(propylene-ethylene) polymer material, the (propylene)-(propylene-ethylene-1-butene) polymer material, the (propylene-ethylene)-(propylene-ethylene) polymer material, the (propylene-ethylene)-(propylene-ethylene-1-butene) polymer material or the (propylene-1-butene)-(propylene-1-butene) polymer material, and is more preferable to be the (propylene)-(propylene-ethylene) polymer material.

It is preferable for the intrinsic-viscosity number ([η]I) of the propylene-based polymer (I) to be 0.10 to 2.00 dL/g, is more preferable to be 0.50 to 1.50 dL/g, and is further preferable to be 0.70 to 1.40 dL/g.

It is preferable for the intrinsic-viscosity number ([η]II) of the propylene copolymer (II) to be 1.00 to 10.00 dL/g, is more preferable to be 2.00 to 10.00 dL/g, and is further preferable to be 2.00 to 8.00 dL/g.

It is preferable for a ratio ([η]II/[η]I) of the intrinsic-viscosity number (η)II of the propylene copolymer (II) to the intrinsic-viscosity number ([η]I) of the propylene-based polymer (I) to be 1 to 20, is more preferable to be 1 to 10, and is further preferable to be 1 to 9.

Examples of methods of measuring the intrinsic-viscosity number ([η]I) of the propylene-based polymer (I) include a method of forming the propylene-based polymer (I) and then measuring the intrinsic-viscosity number of the propylene-based polymer.

The intrinsic-viscosity number ([η]II) of the propylene copolymer (II) can be calculated, for instance, with the use of the intrinsic-viscosity number ([η] Total) of the B component, the intrinsic-viscosity number ([η]I) of the propylene-based polymer (I), and the contents of the propylene copolymer (II) and the propylene-based polymer (I), according to the following expression (6).

$$[\eta]II = ([\eta]Total - [\eta]I \times XI)/XII \tag{6}$$

[η]Total: intrinsic-viscosity number of component B (dL/g)

[η]I: intrinsic-viscosity number (dL/g) of propylene-based polymer (I)

XI: ratio of mass of propylene-based polymer (I) to total mass of component B (mass of propylene-based polymer (I)/mass of component B)

XII: ratio of mass of propylene copolymer (II) to total mass of component B (mass of propylene copolymer (II)/mass of component B)

Here, XI and XII can be determined from a substance balance at the time of the polymerization.

Incidentally, XII may be calculated with the use of the following expression after the quantity of melting heat of the propylene-based polymer (I) and the quantity of melting heat of the component B have been measured.

$$XII = 1 - (\Delta Hf)T/(\Delta Hf)P$$

(ΔHf)T: quantity of melting heat (J/g) of component B
(ΔHf) P: quantity of melting heat (J/g) of propylene-based polymer (I)

It is preferable for the intrinsic-viscosity number ([η] CXIS) of the component CXIS to be 0.10 to 2.00 dL/g, is more preferable to be 0.50 to 1.50 dL/g, and is further preferable to be 0.70 to 1.40 dL/g.

It is preferable for the intrinsic-viscosity number ([η] CXS) of the component CXS to be 1.00 to 10.00 dL/g, is more preferable to be 2.00 to 10.00 dL/g, and is further preferable to be 2.00 to 8.00 dL/g.

It is preferable for a ratio ([η]CXS/[η]CXIS) of the intrinsic-viscosity number ([η]CXS) of the component CXS to the intrinsic-viscosity number ([η]CXIS) of the component CXIS to be 1 to 20, is more preferable to be 1 to 10, and is further preferable to be 1 to 9.

It is preferable for a molecular weight distribution (Mw(I)/Mn(I)) of the propylene-based polymer (I) to be 3.0 or more, and is more preferable to be 6.0 or more.

It is preferable for a molecular weight distribution (Mw(CXIS)/Mn(CXIS)) of the component CXIS to be 3.0 or more, and is more preferable to be 6.0 or more.

It is preferable for an isotactic pentad fraction of the component B to be 0.950 or more, and is more preferable to be 0.970 or more, from the viewpoint of the rigidity and dimensional stability of the molded article formed from the resin composition. Incidentally, the isotactic pentad fraction of the component B may be, for instance, 1.000 or less.

It is preferable for a melt flow rate of the component B at a temperature of 230° C. and a load of 2.16 kgf to be 5 g/10 min or more, and is more preferable to be 10 to 300 g/10 min, from the viewpoint of the moldability of the resin composition.

A content of the component B may be, for instance, 10 to 45 parts by mass or may be 10 to 35 parts by mass with respect to 100 parts by mass in total of the component A, the component B and the component C, from the viewpoint of further improving the dimensional stability of the molded article.

The content of the component B may be adjusted so that when a content of the component C is determined to be 100% by mass, the content of the propylene copolymer (II) in the component B becomes 5 to 50% by mass, preferably becomes 5 to 40% by mass, and more preferably becomes 10 to 25% by mass.

[Ethylene-α-Olefin Copolymer (C)]

In the component C, when the total mass of the component C is determined to be 100% by mass, the total of the contents of the monomer units may be 100% by mass, which are derived from ethylene contained in the component C, and derived from an α-olefin having 4 or more carbon atoms contained therein, respectively.

Examples of the α-olefins having 4 or more carbon atoms include α-olefins having 4 to 12 carbon atoms. Examples of the α-olefins having 4 to 12 carbon atoms include 1-butene, 1-pentene, 1-hexene, 4-methyl-1-pentene, 1-octene and 1-decene. Among the α-olefins, the 1-butene, the 1-hexene and the 1-octene are preferable. The above described α-olefins may be α-olefins having a cyclic structure such as vinyl cyclopropane and vinyl cyclobutane.

Examples of the component C include an ethylene-1-butene copolymer, an ethylene-1-hexene copolymer, an ethylene-1-octene copolymer, an ethylene-1-decene copolymer, an ethylene-(3-methyl-1-butene) copolymer, and a copolymer of ethylene and an α-olefin having the cyclic structure.

In the component C, it is preferable for a content of a monomer unit derived from the α-olefins having 4 or more carbon atoms to be 1 to 49% by mass, is more preferable to be 5 to 49% by mass, and is further preferable to be 24 to 49% by mass, based on the total mass of the component C.

It is preferable for a melt flow rate of the component C at a temperature of 230° C. and a load of 2.16 kgf to be 0.1 g/10 min to 50 g/10 min.

It is preferable for a density of the component C to be 0.850 to 0.890 g/cm$^3$, is more preferable to be 0.850 to 0.880 g/cm$^3$, and is further preferable to be 0.855 to 0.870 g/cm$^3$, from the viewpoint of an impact resistance of the molded article.

The component C can be produced by copolymerization of ethylene and an α-olefin having 4 or more carbon atoms, in the presence of a polymerization catalyst.

Examples of the polymerization catalysts include homogeneous catalysts represented by a metallocene catalyst, and Ziegler-Natta type catalysts.

Examples of the homogeneous catalysts include: a catalyst that consists of a chemical compound of a transition metal in Group 4 of the periodic table having a cyclopentadienyl ring, and of an alkylaluminoxane; a catalyst that consists of a chemical compound of a transition metal in Group 4 of the periodic table having a cyclopentadienyl ring, a chemical compound which reacts with the transition metal compound to form an ionic complex, and an organoaluminum compound; and a catalyst in which a catalytic component (a chemical compound of a transition metal in Group 4 of the periodic table having a cyclopentadienyl ring, a chemical compound which forms an ionic complex, an organoaluminum compound and the like) is carried on an inorganic particle (silica, clay minerals or the like), and is denatured.

Examples of the Ziegler-Natta type catalysts include a catalyst obtained by combining a titanium-containing solid transition metal component with an organometallic component.

A commercialized product may be used for the component C. Examples of the commercially available component C include: ENGAGE (registered trademark) made by Dow Chemical Japan Ltd.; TAFMER (registered trademark) made by Mitsui Chemicals, Inc.; NEO-ZEX (registered trademark) and ULTZEX (registered trademark) made by Prime Polymer Co., Ltd.; and EXCELLEN FX (registered trademark), SUMIKATHENE (registered trademark) and ESPRENE SPO (registered trademark) made by Sumitomo Chemical Company, Limited.

The content of the component C may be, for instance, 15 to 40 parts by mass, or may be 25 to 35 parts by mass, with respect to 100 parts by mass in total of the component A, the component B and the component C, from the viewpoint of the dimensional stability of the molded article.

[Filler (D)]

The propylene resin composition of the present embodiment may further contain a filler (D).

Examples of the component D include an inorganic filler and an organic filler. The propylene resin composition of the present embodiment may contain only one component D, or may contain two or more components.

Examples of the inorganic fillers include glass, silicate mineral, alumina, silica, silicon dioxide, titanium oxide, iron oxide, aluminum oxide, magnesium oxide, antimony oxide, barium ferrite, strontium ferrite, beryllium oxide, magnesium hydroxide, aluminum hydroxide, basic magnesium carbonate, calcium carbonate, magnesium carbonate, carbonate mineral, calcium sulfate, magnesium sulfate, basic magnesium sulfate, calcium sulfite, carbon black and cadmium sulfide.

Examples of the organic fillers include polyesters, aromatic polyamides, cellulose and vinylon.

A shape of the filler may be a plate shape, a needle shape, or a fibrous shape.

It is preferable for the component D to be an inorganic filler, and is more preferable to be talc which is a plate-like silicate mineral, from the viewpoints of the rigidity, impact resistance and dimensional stability of the molded article.

It is preferable for an average particle diameter D50[L] of the component D to be 20.0 μm or less, is more preferable to be 17.0 μm or less, and is further preferable to be 15.0 μm or less, from the viewpoints of the rigidity, impact resistance and dimensional stability of the molded article. The average particle diameter D50[L] of the component D may be, for instance, 2.0 μm or more, may be 4.0 μm or more, or may be 8.0 μm or more. It is preferable for the average particle diameter D50[L] of the component D to be 2.0 to 20.0 μm, is more preferable to be 4.0 to 17.0 μm, and is further preferable to be 8.0 μm to 15.0 μm.

It is preferable for the average particle diameter D50[S] of the component D to be 5.0 μm or less, and is more preferable to be 3.0 μm or less, from the viewpoints of the rigidity, impact resistance and dimensional stability of the molded article. The average particle diameter D50[S] of the component D may be, for instance, 0.5 μm or more, or may be 1.0 μm or more. It is preferable for the average particle diameter D50[S] of the component D to be 0.5 to 5.0 μm, and is more preferable to be 1.0 to 3.0 μm.

D50[L]/D50[S] which is a ratio of the average particle diameter D50[L] of the component D to the average particle diameter D50[S] thereof may be 1.5 or more, or may be 2.5 or more, from the viewpoints of the rigidity and dimensional stability of the molded article. D50[L]/D50[S] may be 10 or less, or may be 8 or less. D50[L]/D50[S] may be 1.5 to 10, or may be 2.5 to 8.

Here, in the present specification, the "average particle diameter D50[L]" is determined on the basis of volume-based particle size distribution measurement data which has been measured by a laser diffraction method according to the method specified in JIS R 1629, and means a particle diameter (50% equivalent particle diameter) where the number of particles accumulated from the side of smaller particle diameter has reached 50% in the particle diameter distribution measurement data. The particle diameter defined in the above way is generally referred to as "50% equivalent particle diameter", and is represented by "D50".

In the present specification, the "average particle diameter D50[S]" is determined on the basis of volume-based particle size distribution measurement data that has been measured by a centrifugal sedimentation method according to the method specified in JIS R 1619, and means a particle diameter (50% equivalent particle diameter) where the number of particles accumulated from the side of smaller particle diameter has reached 50% in the particle diameter distribution measurement data.

It is preferable that the propylene resin composition of the present embodiment contains the component D, and the content of the component D is 1 to 65 parts by mass with respect to 100 parts by mass in total of the component A, the component B and the component C, from the viewpoint of the dimensional stability of the molded article.

The content of the component D may be 10 to 60 parts by mass, or may be 20 to 55 parts by mass, with respect to 100 parts by mass in total of the component A, the component B and the component C, from the viewpoint of the dimensional stability of the molded article.

In the propylene resin composition of the present embodiment, the content of the component A may be 10 to 55% by mass, 20 to 50% by mass, or 30 to 50% by mass, based on the total mass of the propylene resin composition.

In the propylene resin composition of the present embodiment, the content of the component B may be 10 to 55% by mass, 10 to 40% by mass, or 10 to 35% by mass, based on the total mass of the propylene resin composition.

In the propylene resin composition of the present embodiment, the content of the component C may be 10 to 40% by mass, or 15 to 25% by mass, based on the total mass of the propylene resin composition.

In the propylene resin composition of the present embodiment, the content of the component D may be 0 to 40% by mass, 10 to 35% by mass, or 20 to 35% by mass, based on the total mass of the propylene resin composition.

In the propylene resin composition of the present embodiment, it is preferable that the total of the content of the component A, the content of the component B and the content of the component C is 50% by mass or more, based on the total mass of the propylene resin composition.

In the propylene resin composition of the present embodiment, it is preferable that the total content of the content of the component A, the content of the component B, the content of the component C and the content of the component D is 90% by mass or more, based on the total mass of the propylene resin composition.

It is preferable for a melt flow rate of the propylene resin composition of the present embodiment at a temperature of 230° C. and a load of 2.16 kgf to be 15 g/10 min or more, from the viewpoint of the moldability of the resin composition.

The propylene resin composition of the present embodiment can be obtained by melt-kneading each component of the raw material. The temperature at the time of melt-kneading may be 180° C. or higher, 180 to 300° C., or 180 to 250° C.

For melt-kneading, a Banbury mixer, a single screw extruder, a twin-screw co-rotating extruder and the like can be used.

The order of kneading each of the components of the raw materials is not limited in particular. For instance, it is acceptable to collectively knead the component A, the component B, the component C and the component D, or to knead a part of the components of the component A, the component B, the component C and the component D and then knead the obtained kneaded article and the other components.

There is no particular restriction on a shape of the propylene resin composition, but the propylene resin composition may be, for instance, in a form of a strand, a sheet, a flat plate and a pellet. The pellet-like resin composition can be produced, for instance, by forming a strand-like resin composition and cutting it into an appropriate length.

It is preferable for the shape of the resin composition which is before being molded into a molded article is in the form of a pellet having a length of 1 to 50 mm, from the viewpoint of the moldability of the resin composition and the production stability in the case in which the molded article is produced.

The propylene resin composition of the present embodiment may contain components other than the above described components. Examples of such components include neutralizing agents, antioxidants, ultraviolet absorbers, nucleating agents, lubricants, antistatic agents, antiblocking agents, processing aids, organic peroxides, colorants (inorganic pigments, organic pigments and pigment dispersants), foaming agents, foam nucleating agents, plasticizers, flame retardants, crosslinking agents, crosslinking aids, brightening agents, antibacterial agents and light diffusing agents. The propylene resin composition of the present embodiment may contain only one kind of these components, or may contain two or more kinds of these components.

The propylene resin composition of the present embodiment can be used as a material for forming a molded article by being molded. It is preferable for the propylene resin composition of the present embodiment to be used as a material to be injection molded. One example of an injection molded article will be described below which is produced by using the propylene resin composition of the present embodiment as the material to be injection molded.

[Injection Molded Article]

The injection molded article of the present embodiment consists of the propylene resin composition of the present embodiment. Such an injection molded article is excellent in the dimensional stability.

The above injection molded article can be produced by an injection molding method. Examples of the injection molding method include a general injection molding method, an injection foam molding method, a supercritical injection foam molding method, an ultrahigh-speed injection molding method, an injection compression molding method, a gas assisted injection molding method, a sandwich molding method, a sandwich foam molding method, and insert/outsert molding methods. The shape of the injection molded article is not limited in particular.

The injection molded article according to the present embodiment can be preferably used, for instance, in applications for automotive materials, applications for household electrical appliance, and applications for containers. The injection molded article is suitable for the application for the automotive interior/exterior, among the applications. Examples of the automotive interior/exterior parts include a door trim, a pillar, an instrument panel and a bumper.

EXAMPLES

The present invention will be described more specifically with reference to examples. However, the present invention is not limited to these examples.

In the Examples and Comparative Examples, the following raw materials were used.

[Component A: Propylene Homopolymer]

The following propylene homopolymers ((A-1) to (A-4)) were produced.

(A-1) Propylene Homopolymer

MFR (measured at temperature of 230° C. and load of 2.16 kgf): 62 g/10 min, intrinsic-viscosity number ($\eta$): 1.11 dug, isotactic pentad fraction: 0.9768, and Mw/Mn: 8.8

(A-2) Propylene Homopolymer

The propylene homopolymer was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 107 g/10 min, intrinsic-viscosity number ($\eta$): 0.92 dL/g, isotactic pentad fraction: 0.9811, and Mw/Mn: 5.4

(A-3) Propylene Homopolymer

The propylene homopolymer was produced by an operation of changing the hydrogen concentration between two gas phase polymerization vessels in the gas phase polymerization method, in the presence of the polymerization catalyst which was obtained according to the method described in Example 1 of Japanese Unexamined Patent Publication No. 2004-182981.

MFR (measured at temperature of 230° C. and load of 2.16 kgf): 80 g/10 min, intrinsic-viscosity number (η): 1.13 dL/g, isotactic pentad fraction: 0.9760, and Mw/Mn: 10

(A-4) Propylene Homopolymer

The propylene homopolymer was produced by an operation of changing the hydrogen concentration between two gas phase polymerization vessels in the gas phase polymerization method, in the presence of the polymerization catalyst which was obtained according to the method described in Example 1 of Japanese Unexamined Patent Publication No. 2004-182981.

MFR (measured at temperature of 230° C. and load of 2.16 kgf): 144 g/10 min, intrinsic-viscosity number (η): 0.99 dL/g, isotactic pentad fraction: 0.9834, and Mw/Mn: 7.0

[Component B: Heterophasic Propylene Polymer Material]

The following heterophasic propylene polymer materials ((B-1) to (B-7)) were prepared.

(B-1) (Propylene)-(Propylene-Ethylene) Polymer Material

MFR (measured at temperature of 230° C. and load of 2.16 kgf): 38 g/10 min
Amount of component CXIS: 69.5% by mass
Mw/Mn of component CXIS: 5.4

An ethylene content in the propylene copolymer (II) (content of a monomer unit derived from ethylene, based on total mass of propylene copolymer (II)): 45.5% by mass
Isotactic pentad fraction: 0.9776
intrinsic-viscosity number ([η]CXIS): 1.03 dL/g, and ([η]CXS): 2.07 dL/g (B-2) (Propylene)-(Propylene-Ethylene) Polymer Material The (propylene)-propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 51 g/10 min
Amount of component CXIS: 74.1% by mass
Mw/Mn of component CXIS: 5.1

The ethylene content in the propylene copolymer (II) (content of a monomer unit derived from ethylene, based on total mass of the propylene copolymer (II)): 31.3% by mass
Isotactic pentad fraction: 0.9785
intrinsic-viscosity number ([η]CXIS): 0.97 dL/g, and ([η]CXS): 2.44 dL/g (B-3) (Propylene)-(Propylene-Ethylene) Polymer Material The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 20 g/10 min
Amount of component CXIS: 74.3% by mass
Mw/Mn of component CXIS: 6.1

The ethylene content in the propylene copolymer (II) (content of a monomer unit derived from ethylene based on total mass of propylene copolymer (II)): 52.9% by mass
Isotactic pentad fraction: 0.9853
intrinsic-viscosity number ([η]CXIS): 1.14 dL/g, and ([η]CXS): 2.76 dL/g (B-4) (Propylene)-(Propylene-Ethylene) Polymer Material A (propylene)-(propylene-ethylene) polymer material (B-4) was produced by an operation of: producing a propylene homopolymer by a multistage gas phase polymerization method in which two gas phase polymerization vessels were connected in series, in the presence of a polymerization catalyst which was obtained according to the method described in Example 1 of Japanese Unexamined Patent Publication No. 2004-182981, and copolymerizing propylene and ethylene in the presence of the above described propylene homopolymer in the subsequent gas phase polymerization vessel. The hydrogen concentrations in the two gas phase polymerization vessels for producing the propylene homopolymer were adjusted so as to be different from each other.

MFR (measured at temperature of 230° C. and load of 2.16 kgf): 25 g/10 min
Amount of component CXIS: 77.4% by mass
Mw/Mn of component CXIS: 9.5

The ethylene content in the propylene copolymer (II) (content of a monomer unit derived from ethylene, based on total mass of propylene copolymer (II)): 49.1% by mass
Isotactic pentad fraction: 0.9755
intrinsic-viscosity number: ([η]CXIS) 1.32 dL/g, and ([η]CXS): 2.31 dL/g (B-5) (Propylene)-(Propylene-Ethylene) Polymer Material The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 32 g/10 min
Amount of component CXIS: 83.1% by mass
Mw/Mn of component CXIS: 4.8

The ethylene content in the propylene copolymer (II) (content of a monomer unit derived from ethylene, based on total mass of the propylene copolymer (II)): 37.0% by mass
Isotactic pentad fraction: 0.9832
intrinsic-viscosity number ([η]CXIS): 1.13 dL/g, and ([η]CXS): 2.38 dL/g (B-6) (Propylene)-(Propylene-Ethylene) Polymer Material The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 29 g/10 min
Amount of component CXIS: 82.7% by mass
Mw/Mn of component CXIS: 6.2

The ethylene content in the propylene copolymer (II) (content of a monomer unit derived from ethylene, based on total mass of the propylene copolymer (II)): 51.4% by mass
Isotactic pentad fraction: 0.9849
intrinsic-viscosity number ([η]CXIS): 1.20 dL/g, and ([η]CXS): 3.06 dL/g (B-7) (Propylene)-(Propylene-Ethylene) Polymer Material A (propylene)-(propylene-ethylene) polymer material (B-7) was produced by an operation of: producing a propylene homopolymer by a multistage gas phase polymerization method in which two gas phase polymerization vessels were connected in series, in the presence of a polymerization catalyst which was obtained according to the method described in Example 1 of Japanese Unexamined Patent Publication No. 2004-182981, and copolymerizing propylene and ethylene in the presence of the above described propylene homopolymer in the subsequent gas phase polymerization vessel. The hydrogen concentrations in the two gas phase polymerization vessels for producing the propylene homopolymer were adjusted so as to be different from each other.

MFR (measured at temperature of 230° C. and load of 2.16 kgf): 50 g/10 min

Amount of component CXIS: 82.5% by mass

Mw/Mn of component CXIS: 8.4

The ethylene content in the propylene copolymer (II) (content of a monomer unit derived from ethylene, based on total mass of propylene copolymer (II)): 57.9% by mass Isotactic pentad fraction: 0.9828 intrinsic-viscosity number: ($[\eta]$CXIS) 1.13 dL/g, and ($[\eta]$CXS): 2.39 dL/g

[Component C: Ethylene-$\alpha$-Olefin Copolymer]

The following ethylene-$\alpha$-olefin copolymers ((C-1) and (C-2)) were prepared.

(C-1) Ethylene-1-Butene Copolymer

"ENR 7467" made by The Dow Chemical Company

Density: 0.862 g/cm$^3$

MFR (measured at temperature of 230° C. and load of 2.16 kgf): 2.5 g/10 min (C-2) Ethylene-1-Octene Copolymer "EG 8842" made by The Dow Chemical Company Density: 0.857 g/cm$^3$ MFR (measured at temperature of 230° C. and load of 2.16 kgf): 2.7 g/10 min

[Component D: Filler]

The following (D-1) was prepared as a filler.

(D-1) Talc

"HARW 92" made by Imerys

Average particle diameter D50[L] (laser diffraction method and 50% equivalent particle diameter): 11.4 µm Average particle diameter D50[S] (centrifugal sedimentation method and 50% equivalent particle diameter): 2.54 µm Here, the average particle diameter D50[L] of the talc was measured with the use of Microtrac Particle Size Analyzer MT-3300EXII made by Nikkiso Co., Ltd. according to the method specified in JIS R 1629, after the particles were dispersed under the following condition.

(Particles Dispersing Treatment)

Dispersion medium: Ethanol

Apparatus: Homogenizer

Output power: 40 W

Treating time: 10 minutes

In addition, the D50[S] was measured with the use of a centrifugal sedimentation type particle size distribution analyzer SA-CP3 made by Shimadzu Corporation according to the method specified in JIS R 1619, after the particles were dispersed under the following condition.

(Particles Dispersing Treatment)

Dispersion medium: Ethanol

Apparatus: W-113MkII made by Honda Electronics Co., Ltd.

Output power: 110 W 24 kHz

Treating time: 10 minutes

As for the components A to C, the MFR, the intrinsic-viscosity number and the isotactic pentad fraction were measured according to the above described methods.

The contents of the component CXIS and the component CXS in the component B and the ethylene content in the propylene copolymer (II) were calculated according to the following method.

(Contents of Component CXIS and Component CXS in Component B)

The component B in an amount of 2 g was weighed ("mass of component B" will be referred to as "a"), and was heated and dissolved in boiling xylene for 2 hours. Then, the resultant liquid was cooled to 20° C., and filtered with the use of filter paper. The filtered filtrate was concentrated under reduced pressure by a rotary evaporator, and the component CXS was obtained. The obtained component CXS was weighed ("mass of component CXS" will be referred to as "b"). The contents of the component CXIS and the component CXS in the component B were calculated according to the following expressions, with the use of the numerical values a and b. In addition, the solid matter remaining on the filter paper was dried in a vacuum, and the component CXIS was obtained. The obtained component CXIS was used for the evaluation of the molecular weight distribution of the crystalline polypropylene component, which will be described later.

amount of component CXS (% by mass)=($b/a$)×100 amount of component CXIS (% by mass)=100− amount of component CXS (% by mass)

(Ethylene Content in Propylene Copolymer (II))

The ethylene content in the propylene copolymer (II) was determined on the basis of the report by Kakugo and others (Macromolecules, 15, 1150-1152 (1982)), from the $^{13}$C-NMR spectrum which was measured under the following conditions. The $^{13}$C-NMR spectrum was measured under the following conditions with the use of a sample in which approximately 200 mg of the component B was uniformly dissolved in 3 mL of orthodichlorobenzene in a test tube with a diameter of 10 mm.

Measurement temperature: 135° C.

Pulse repetition time period: 10 seconds

Pulse width: 45°

Number of integration times: 2500 times

Examples 1 to 7 and Comparative Examples 1 to 8

[Production of Propylene Resin Composition]

The propylene homopolymers (A-1), (A-2), (A-3) and (A-4), the heterophasic propylene polymer materials (B-1), (B-2), (B-3), (B-4), (B-5), (B-6) and (B-7), the ethylene-$\alpha$-olefin copolymers (C-1) and (C-2) and the filler (D-1) were prepared in amounts shown in Table 1 and Table 2.

The respectively prepared components were uniformly premixed with a Henschel mixer or a tumbler, and then were kneaded and extruded with the use of a twin-screw kneading extruder (TEX 44$\alpha$II-49BW-3V type made by Japan Steel Works, Ltd.) at an extrusion amount of 70 kg/hr, 200° C. and a screw speed of 300 rpm, under vent suction, and resin compositions were produced. Physical properties of the obtained resin compositions are shown in the following Table 1 and Table 2.

(Evaluation of Molecular Weight Distribution)

The weight average molecular weights (Mw(A)) and the number average molecular weights (Mn(A)) of the propylene homopolymers (A) were measured with GPC. The weight average molecular weights Mw(CXIS(B)) and the number average molecular weights Mn(CXIS(B)) of the components CXIS, which were obtained by the above described operation, were measured with GPC. Incidentally, measurement conditions of the GPC are as described above. Next, the molecular weight distributions (Mw/Mn of part P) of the crystalline polypropylene component were calculated with the use of the expressions (1), (2), (3), (4) and (5). In addition, ratios (Mw(A)/Mn(A)) of the Mw(A) to the Mn(A), and ratios (Mw(CXIS(B))/Mn(CXIS(B))) of the Mw(CXIS(B) to the Mn(CXIS(B)) were calculated, and thereby Mw/Mn of the component A and Mw/Mn of the component CXIS in the component (B) were determined. These results are shown in Table 1 and Table 2.

[Production of Injection Molded Article]

The obtained resin compositions were injection molded under the following conditions, and injection molded articles were produced. The resin compositions were injection molded while SE180D with a fastening force of 180 tons made by Sumitomo Heavy Industries, Ltd. was used as an injection molding machine, and a mold with one point gate from the end face was used, which had a thickness of 100 mm×400 mm×3 mm, on conditions of a molding temperature of 220° C., an injection speed of 23 mm/sec and a mold temperature of 50° C.

(Evaluation of Dimensional Stability)

The dimensional stability was evaluated by an operation of measuring the coefficients of linear expansion by using the obtained injection molded articles. The coefficient of linear expansion was measured with the use of a thermomechanical analyzer TMA/SS 6100 made by SII Nanotechnology Co., according to the following method.

A test piece of 5×10×3 (mm) was cut out from the center portion in the longitudinal direction of the injection molded article. The test piece was set in the above described apparatus, and the temperature was raised from −20° C. to 130° C. at a rate of temperature rise of 5° C./min, and the residual strain at the time of molding was removed. After that, the test piece was set in the apparatus again so that the change in a dimension of an MD direction (direction of resin flow) at the time of the injection molding or a TD direction (direction orthogonal to MD direction) could be measured, and the dimension at 23° C. was accurately measured. The temperature was raised from −20 to 80° C. at a rate of temperature rise of 5° C./min, and the changes in the dimensions in the MD direction and the TD direction during the temperature rise were measured. The change in the dimension per unit length and unit temperature was determined as the coefficient of linear expansion. The value obtained by dividing the sum of the coefficient of linear expansion in the MD direction and the coefficient of linear expansion in the TD direction by 2 was defined as "coefficient of MDTD average linear expansion" (unit: 1/° C.). The coefficient of MDTD linear expansion means that the smaller the value is, the better the dimensional stability is.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| A-1 (part by mass) | 50 | 47.5 | — | — | — | — | 47.5 | — |
| A-2 (part by mass) | — | — | — | 40.5 | — | 47.5 | — | 53.5 |
| A-3 (part by mass) | — | — | 40.5 | — | 53.5 | — | — | — |
| B-1 (part by mass) | — | 20 | — | — | 17.5 | — | — | — |
| B-2 (part by mass) | — | — | — | — | — | 20 | 20 | 17.5 |
| B-3 (part by mass) | 17.5 | — | — | — | — | — | — | — |
| B-4 (part by mass) | — | — | 27 | 26.5 | — | — | — | — |
| C-1 (part by mass) | 16 | 16 | 16 | 16.5 | 14 | 16 | 16 | 14 |
| C-2 (part by mass) | 16.5 | 16.5 | 16.5 | 16.5 | 15 | 16.5 | 16.5 | 15 |
| D-1 (part by mass) | 33 | 33 | 33 | 33 | 33 | 33 | 33 | 33 |
| Content of component CXIS in component B (% by mass) | 74.3 | 65.9 | 77.4 | 77.4 | 69.5 | 74.1 | 74.1 | 74.1 |
| Mw/Mn of component A | 8.8 | 8.8 | 10 | 5.4 | 10 | 5.4 | 8.8 | 5.4 |
| Mw/Mn of component CXIS in component B | 6.1 | 5.4 | 9.5 | 9.5 | 5.4 | 5.1 | 5.1 | 5.1 |
| Mw/Mn of part P | 8.0 | 7.7 | 9.8 | 6.7 | 8.9 | 5.4 | 7.6 | 5.4 |
| Ethylene content (% by mass) in propylene copolymer (II) | 52.9 | 45.5 | 49.1 | 49.1 | 45.5 | 31.3 | 31.3 | 31.3 |
| Coefficient of MDTD average linear expansion ($10^{-5}$/° C.) | 3.99 | 4.09 | 3.75 | 3.99 | 4.35 | 4.84 | 4.55 | 5.05 |

TABLE 2

|  | Example 6 | Example 7 | Comparative Example 4 | Comparative Example 5 | Comparative Example 6 | Comparative Example 7 | Comparative Example 8 |
|---|---|---|---|---|---|---|---|
| A-2 (part by mass) | — | — | — | 35.0 | 72.1 | 60.5 | — |
| A-3 (part by mass) | 35.0 | — | 31.3 | — | — | — | 67 |
| A-4 (part by mass) | — | 35.3 | — | — | — | — | — |
| B-2 (part by mass) | — | — | — | — | 16.7 | 15 | — |
| B-5 (part by mass) | — | — | 36 | — | — | — | — |

TABLE 2-continued

|  | Example 6 | Example 7 | Comparative Example 4 | Comparative Example 5 | Comparative Example 6 | Comparative Example 7 | Comparative Example 8 |
|---|---|---|---|---|---|---|---|
| B-6 (part by mass) | 32.5 | — | — | 32.5 | — | — | — |
| B-7 (part by mass) | — | 32 | — | — | — | — | 21.8 |
| C-1 (part by mass) | 16 | 16 | 16 | 16 | 5.6 | 12 | 5.6 |
| C-2 (part by mass) | 16.5 | 16.7 | 16.7 | 16.5 | 5.6 | 12.5 | 5.6 |
| D-1 (part by mass) | 33 | 33 | 33 | 33 | 11 | 0 | 11 |
| Content of component CXIS in component B (% by mass) | 82.7 | 82.5 | 83.1 | 82.7 | 74.1 | 74.1 | 82.5 |
| Mw/Mn of component A | 10 | 7 | 10 | 5.4 | 5.4 | 5.4 | 10 |
| Mw/Mn of component CXIS in component B | 6.2 | 8.4 | 4.8 | 6.2 | 5.1 | 5.1 | 8.4 |
| Mw/Mn of part P | 8.3 | 7.7 | 7.1 | 5.8 | 5.4 | 5.4 | 9.5 |
| Ethylene content (% by mass) in propylene copolymer (II) | 51.4 | 57.9 | 37.0 | 51.4 | 31.3 | 31.3 | 57.9 |
| Coefficient of MDTD average linear expansion ($10^{-5}/°C$.) | 3.97 | 3.53 | 4.55 | 4.42 | 8.13 | 11.76 | 7.77 |

It is understood from Table 1 and Table 2 that the injection molded article according to the Example has a low coefficient of MDTD average linear expansion and is excellent in the dimensional stability. In other words, it has been confirmed that according to the propylene resin composition of the present embodiment, a molded article excellent in the dimensional stability can be produced and that the injection molded article of the present embodiment is excellent in the dimensional stability.

This application claims priority from Japanese patent application No. 2017-080584 (filed on Apr. 14, 2017), the entire disclosure of which is incorporated herein by reference.

What is claimed is:

1. A propylene resin composition comprising:
   a propylene homopolymer (A);
   a heterophasic propylene polymer material (B) consisting of a propylene-based polymer (I) containing 80% by mass or more of a monomer unit derived from propylene, and a propylene copolymer (II) containing 40% by mass or more and 80% by mass or less of a monomer unit derived from at least one α-olefin selected from the group consisting of ethylene and α-olefins having 4 or more and 12 or less carbon atoms, and containing a monomer unit derived from propylene; and
   an ethylene-α-olefin copolymer (C), the ethylene-α-olefin copolymer (C) not containing a monomer unit derived from propylene, wherein
   a molecular weight distribution (Mw/Mn of part P) of a crystalline polypropylene component calculated from the following expressions (1), (2), (3), (4) and (5) is 6.0 or more; and
   contents of the propylene homopolymer (A), the heterophasic propylene polymer material (B) and the ethylene-α-olefin copolymer (C) are 10 to 55 parts by mass, 10 to 55 parts by mass, and 10 to 40 parts by mass, respectively, with respect to 100 parts by mass in total of the propylene homopolymer (A), the heterophasic propylene polymer material (B) and the ethylene-α-olefin copolymer (C), $$\text{Mw/Mn of part } P = \text{Mw}(A, CXIS(B))/\text{Mn}(A, CXIS(B)) \quad (1),$$

$$\text{Mw}(A, CXIS(B)) = \text{Mw}(A) \times \phi(A) + \text{Mw}(CXIS(B)) \times \phi(CXIS(B)) \quad (2),$$

$$\text{Mn}(A, CXIS(B)) = 1/(\phi(A)/\text{Mn}(A) + \phi(CXIS(B))/\text{Mn}(CXIS(B))) \quad (3),$$

$$\phi(A) = X/(X+Y) \quad (4), \text{ and}$$

$$\phi(CXIS(B)) = Y/(X+Y) \quad (5)$$

wherein Mw(A) and Mn(A) represent a weight average molecular weight and a number average molecular weight of the propylene homopolymer (A), respectively, and Mw(CXIS(B)) and Mn(CXIS(B)) represent a weight average molecular weight and a number average molecular weight of a xylene-insoluble component in the heterophasic propylene polymer material (B), respectively; and X represents a content (% by mass) of the propylene homopolymer (A) with respect to a total mass of the propylene resin composition, and Y represents a content (% by mass) of the xylene-insoluble component in the heterophasic propylene polymer material (B) with respect to the total mass of the propylene resin composition.

2. The propylene resin composition according to claim 1, further comprising a filler (D),
   wherein a content of the filler (D) is 1 to 65 parts by mass, with respect to 100 parts by mass in total of the propylene homopolymer (A), the heterophasic propylene polymer material (B) and ethylene-α-olefin copolymer (C).

3. An injection molded article comprising the propylene resin composition according to claim 1.

4. An injection molded article comprising the propylene resin composition according to claim 2.

* * * * *